Patented Jan. 9, 1934

1,942,799

UNITED STATES PATENT OFFICE 1,942,799

NEGATIVELY CHARGED ALUMINUM GEL

Pearl H. Brewer and Henry R. Kraybill, West Lafayette, Ind., assignors to Purdue Research Foundation, West Lafayette, Ind., a corporation of Indiana No Drawing. Application March 26, 1932
Serial No. 601,455

6 Claims. (Cl. 23—143)

It is the object of our invention to produce an aluminum gel which carries a negative charge.

Our negatively charged aluminum gel is a special acid form of aluminum gel, and is made in the following manner:

Two liters of a 25% solution of aluminum sulphate, $Al_2(SO_4)_3$, are prepared by dissolving the aluminum sulphate in distilled water. This solution is divided into two equal parts—of one liter each. Dilute ammonium hydroxide is added to one part until the solution is alkaline to litmus—or until complete precipitation occurs and a slight odor of ammonia remains. Then the other part of the original aluminum-sulphate solution is added to the part which was made alkaline, and the combined material is thoroughly mixed. The mixture is allowed to stand and settle in a warm room for twenty-four hours, by which time a white gelatinous precipitate has formed and settled to the bottom of the container. The supernatant liquid is removed, as by decanting or siphoning. Distilled water is added to the remaining precipitate, to restore the original volume; and the whole is stirred or shaken, and again allowed to settle in a warm room for about twenty-four hours, when the clear supernatant liquid is again removed as before. This cycle of adding distilled water to the gelatinous precipitate, shaking or stirring, settling, and decanting is repeated until the ammonium salts are practically all removed, at which time the hydrogen ion concentration of the creamy precipitate remaining reaches a substantially constant value; which although in some cases between pH 5.0 and pH 6.0 is usually between pH 4.4 and pH 5.0, and is in all cases on the acid side of pH 6.0. Thus this aluminum gel has an acid reaction, instead of the alkaline or nearly neutral (pH 6.5 or higher) reaction of the ordinary aluminum gel.

This acid-reaction creamy precipitate contains negatively charged particles, and is our negatively charged aluminum gel.

When a suspension of this negatively charged aluminum gel is added to various solutions or suspensions, it is found that a flocculation and coagulation occurs of some of the matter present in such solution or suspension, while some co-present matter is not flocculated or coagulated. For best results, the suspension of the aluminum gel is added in small quantities, with constant stirring, until flocculation or coagulation appears; and the hydrogen ion concentration is desirably maintained between pH 4 and pH 6.5 during flocculation or coagulation, although this ordinarily requires no additional reagent because the aluminum gel itself usually exhibits an acid reaction. The flocculum or coagulum produced may be removed, to leave the unflocculated matter in the solution in purified form.

Our aluminum gel is of particular use in such purification of suspensions or solutions containing negatively charged matter contaminated with extraneous matter. The negatively charged aluminum gel apparently collects the extraneous matter into the flocculum or coagulum, which may be removed by centrifuging or filtering; and leaves in solution the negatively charged matter that was co-present with such extraneous matter and that is desired in purified form.

One example of the use of our negatively charged aluminum gel is in the purification of viruses as set forth in the co-pending application filed by us and Max W. Gardner, Serial No. 601,450, filed March 26, 1932.

We claim as our invention:

1. A negatively charged aluminum gel.

2. An aluminum gel which has an acid reaction on the acid side of pH 6.0.

3. An aluminum gel which has a hydrogen ion concentration between pH 4.4 and pH 5.0.

4. An aluminum gel which maintains a substantially constant acid-reaction hydrogen ion concentration under repeated additions of distilled water, stirring, settling, and decanting.

5. The process of making a negatively charged aluminum gel, which consists in adding ammonium hydroxide to aluminum sulphate until the solution is alkaline to litmus, adding an additional amount of aluminum sulphate substantially equal to the original amount and thoroughly mixing, permitting a white gelatinous precipitate which has formed to settle and removing the supernatant liquid, and repeatedly adding water to the precipitate, shaking, permitting settling, and removing the clear supernatant liquid, until the ammonium salts are practically all removed.

6. The process of making a negatively charged aluminum gel, which consists in adding ammonium hydroxide to aluminum sulphate until the solution is alkaline to litmus, adding an additional amount of aluminum sulphate substantialy equal to the original amount and thoroughly mixing, permitting a white gelatinous precipitate which has formed to settle and removing the supernatant liquid, and repeatedly adding water to the precipitate, shaking, permitting settling, and removing the clear supernatant liquid until the hydrogen ion concentration of the creamy precipitate remaining reaches a substantially constant value.

PEARL H. BREWER.
HENRY R. KRAYBILL.